(12) United States Patent
Pews

(10) Patent No.: US 7,153,925 B2
(45) Date of Patent: Dec. 26, 2006

(54) **CONDENSATION POLYMERS FROM N, N\*-DISUBSTITUTED DISULFONAMIDES**

(76) Inventor: R. Garth Pews, 4830 Osprey Dr., South, Apt. 605, St. Petersburg, FL (US) 33711

( \* ) Notice: Subject to any disclaimer, the term of this patent is extended or adjusted under 35 U.S.C. 154(b) by 145 days.

(21) Appl. No.: 11/012,828

(22) Filed: Dec. 15, 2004

(65) Prior Publication Data

US 2006/0128924 A1   Jun. 15, 2006

(51) Int. Cl.
*C08G 18/60*   (2006.01)
(52) U.S. Cl. .......................... 528/68; 528/85; 528/337; 528/372; 528/391
(58) Field of Classification Search ............... 528/68, 528/85, 337, 372, 391
See application file for complete search history.

(56) References Cited

U.S. PATENT DOCUMENTS 3,153,020 A * 10/1964 Butler et al. ................ 526/285

\* cited by examiner

*Primary Examiner*—Rachel Gorr
(74) *Attorney, Agent, or Firm*—Bernd W. Sandt; Sandt & Associates

(57) ABSTRACT

The present invention relates to novel condensation polymers where N,N\*-disubstituted disulfonamides are copolymerized with an organic acid dihalide such as dicarboxylic acid dichlorides, disulfonic acid dichlorides, bis chloroformates, diphosphoryl acid dichlorides, diphosphonyl acid dichlorides, or phosgene or with diisocyanates. The polymers obtained are thermoplastic and useful in molding and extrusion application.

20 Claims, No Drawings

CONDENSATION POLYMERS FROM N, N\*-DISUBSTITUTED DISULFONAMIDES

BACKGROUND OF THE INVENTION

This invention relates to the synthesis of novel synthetic resins wherein a N,N\*-substituted disulfonamide is copolymerized with either an organic acid dichloride or diisocyanate. The principle object of this invention is the demonstration of the synthesis of novel synthetic resins from N,N\*-disubstituted disulfonamides. More specific objectives and advantages are apparent from the description, which discloses and illustrates but is not intended to limit the scope of the invention.

The global production of resins in multibillion-pound quantities includes polycarbonates and epoxy resins. The bulk of these resins utilize bisphenol-A. Recent research (Current Biology, Volume 13, page 546, 2003) has shown that abnormalities in developing mouse eggs occurred at levels of bisphenol-A from hydrolysis of bisA polycarbonate. Similar aberration in human eggs would lead to miscarriages and birth defects. The bisphenol-A epoxy resin is based on the following technology, which requires no less than twelve chemical transformations as illustrated below:

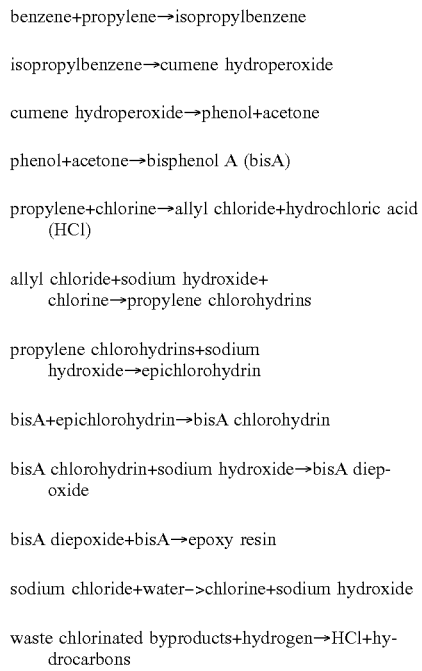

benzene+propylene→isopropylbenzene isopropylbenzene→cumene hydroperoxide cumene hydroperoxide→phenol+acetone phenol+acetone→bisphenol A (bisA)

propylene+chlorine→allyl chloride+hydrochloric acid (HCl)

allyl chloride+sodium hydroxide+ chlorine→propylene chlorohydrins propylene chlorohydrins+sodium hydroxide→epichlorohydrin bisA+epichlorohydrin→bisA chlorohydrin bisA chlorohydrin+sodium hydroxide→bisA diepoxide bisA diepoxide+bisA→epoxy resin sodium chloride+water→chlorine+sodium hydroxide waste chlorinated byproducts+hydrogen→HCl+hydrocarbons The reaction sequence has several negative process implications with regards to yields of chlorinated byproducts, hydraulic load as well as the above-mentioned biological problem. Benzene is a known carcinogen and the process for the production of epichlorohydrin produces considerable quantities of chlorinated byproducts. In addition, the process requires a chlor-alkali facility, hence a local supply of salt and copious quantities of water. The products and processes of the present invention ameliorate some of the disadvantages of the prior art of the products and processes.

BRIEF DESCRIPTION OF THE INVENTION

The present invention relates to the preparation of novel condensation polymers wherein N,N\*-disubstituted disulfonamides are co polymerized with either an organic acid dichloride or a diisocyanate. Organic acid dichlorides may be selected from any of the following: dicarboxylic acid dichlorides, disulfonic acid dichlorides, phosphoric acid dichlorides, phosphonic acid dichlorides, bischloroformates and phosgene. N,N\*-disubstituted disulfonamides may be prepared from either a disulfonyl dichloride and an organic amine, or from an organic diamine and a sulfonyl chloride, and have the formulas:

$$RN(H)SO_2R^*SO_2N(H)R \quad (1a)$$

and $$RSO_2N(H)R^*N(H)SO_2R \quad (1b),$$

where R is a monovalent hydrocarbon alkyl aryl, aryl-alkyl, alkyl-aryl radical of 1–20 carbon atoms or a monovalent inertly substituted hydrocarbon aryl, alkyl, alkyl-aryl or aryl-alkyl radical of 1–20 carbons atoms and R\* is a divalent hydrocarbon arylene, alkylene, alkylene-aryl, arylene-alkyl radical or combinations thereof of 2–20 carbon atoms or an inertly substituted divalent hydrocarbon alkylene, arylene, arylene-alkyl, or alkylene-aryl radical or combinations thereof of 2–20 carbon atoms. The term "inertly substituted" is defined as meaning substituents on the hydrocarbon radicals that do not interfere in the reaction scheme employed to prepare the novel polymers of the present invention. Such substituents would be apparent to those skilled in the art from the reactions set forth and are primarily halogen, ether, ester and amide substituents. Preferred mono and divalent aromatic moieties are derived from hydrocarbons, which include but are not limited to benzene, naphthalene, toluene, chlorobenzene, xylene, biphenyl, phenyl ether, phenyl sulfone and benzophenone. Preferred aryl alkyl moieties include but are not limited to benzyl, bibenzyl, 1,2-diphenoxyethane, 1,4-diphenoxybutane. Preferred alkyl moieties include but are not limited to ethyl, propyl, hexyl, octyl, cyclohexyl and methoxyethyl.

The comonomers used in forming the condensation polymers of the present invention are organic diacid halides, and preferably chlorides or diisocyanates, which have the general formula:

$$X-R^{**}-X \quad (2)$$

When X is —COCl, (2) is a dicarboxylic acid dichloride (2a), when X is —SO$_2$Cl, (2) is a disulfonic acid dichloride (2b); when X is —OCOCl, (2) is a bis chloroformate (2c); when X is —OP(O)(OR)$_2$)(2) is a diphosphoric acid ester (2d); when X is —P(O)(OR)$_2$, (2) is a diphosponic acid ester(2e); -when X is —Cl, (2) is phosgene (2f), and when X is —NCO, (2) is a diisocyanate (2g). R\*\* includes R\* as defined above and —CO— derived from phosgene. The repeating units of the polymers of the present invention can be represented by the following formulas:

| | |
|---|---|
| —N(R)SO$_2$R\*SO$_2$N(R)C(O)R\*\*C(O)— | 3aa |
| —N(R)SO$_2$R\*SO$_2$N(R)SO$_2$R\*\*SO$_2$— | 3ab |
| —N(R)SO$_2$R\*SO$_2$N(R)OC(O)R\*\*OC(O)— | 3ac |
| —N(R)SO$_2$R\*SO$_2$N(R)P(OR)(O)R\*\*P(O)(OR)— | 3ad |
| —N(R)SO$_2$R\*SO$_2$N(R)P(OR)OR\*\*OP(O)(OR)— | 3ae |
| —N(R)SO$_2$R\*SO$_2$N(R)C(O)— | 3af |
| —N(R)SO$_2$R\*SO$_2$N(R)C(O)NHR\*\*NHC(O)— | 3ag |
| —N(RSO$_2$)R\*N(RSO$_2$)C(O)R\*\*C(O)— | 3ba |
| —N(RSO$_2$)R\*N(RSO$_2$)SO$_2$R\*\*SO$_2$— | 3bb |
| —N(RSO$_2$)R\*N(RSO$_2$)C(O)OR\*\*OC(O)— | 3bc |
| —N(RSO$_2$)R\*N(RSO$_2$)P(O)(OR)R\*\*P(O)(OR)— | 3bd |
| —N(RSO$_2$)R\*N(RSO$_2$)P(O)(OR)OR\*\*OP(O)(OR)— | 3be |
| —N(RSO$_2$)R\*N(RSO$_2$)C(O)— | 3bf |
| —N(RSO$_2$)R\*N(RSO$_2$)C(O)N(H)R\*\*N(H)C(O)— | 3bg |

DETAILED DESCRIPTION OF THE INVENTION

The synthesis of N,N*-disubstituted disulfonamides may be achieved from either the reaction of 2 equivalents of a mono substituted amine with a disulfonyl dichloride or by the reaction of 2 equivalents of a sulfonyl chloride with an equivalent of a primary amine as illustrated in the equations below:

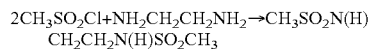

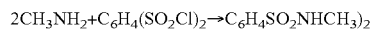

The preparation of the sulfonamides and sulfonyl chlorides employed in the present invention has been reviewed in the literature (The Chemistry of Sulfonic Acids, Esters and their Derivatives, Chapter 10; Preparation of Sulfonic Acids, Esters, Amides and Halides by J. Doyle, John Wiley & Sons 1991). The preparation of the sulfonamides is further illustrated in my copending application Ser. No. 11/012,829 filed Dec. 15, 2004 published as US 20060128978. The utilization of N,N*-disubstituted disulfonamides for the synthesis of hydroxy functional (ether sulfonamides) as thermoplastic barrier resins has been reported (U.S. Pat. No. 5,149,768).

The polymer-forming chemistry of the present invention, i.e., the chemical transformation of a substituted sulfonamide with either an acid chloride or isocyanate to form a chemical moiety that is the linking unit of the condensation polymer is described and illustrated in Examples 1–6. N-Methyl-4-methylbenzene sulfonamide was utilized as the "model" sulfonamide for the reaction of the acid chlorides/isocyanates to define the repeating functional moiety of the polymers. Several of the model substrates were prepared under thermal conditions, that is by heating the reactants in a high boiling solvent such as 1,2-dichlorobenzene to eliminate hydrochloric acid and also achieve the addition of the sulfonamide to the isocyanate. The alternative procedure involves generating the disodium salt of the disulfonamide followed by the addition of the acid chloride. The examples of the polymer preparation were carried out by generating the disodium salt followed by the addition of the acid chloride or in the case of the isocyanate by using a basic catalyst (e.g., a tertiary organic amine). Interfacial processes utilized for the production of polycarbonates can also form the condensation polymers of the present invention.

The following are some examples of N,N*-substituted disulfonamides used in the present invention: N,N*-dimethyl-1,3-benzene disulfonamide, N,N*-dicyclohexyl-2,5-dimethylbenzene disulfonamide, N,N*-diethyl-2,6-naphthalene disulfonamide, N,N*-dibutoxyethyl-2,6-naphthalene disulfonamide, N,N*-diethyl-4,4*-phenyl ether disulfonamide, N,N*-bis(methylsulfonyl)-1,8-diaminooctane, N,N*-bis(methylsulfonyl)-1,5-diaminonaphthalene.

The following are some examples of dicarboxylic acid dichlorides used in the present invention: succinyl chloride, adipoyl chloride, 1,3-phthalic dichloride, 4,4*-phenyl ether dicarboxylic acid dichloride, 4,4*-biphenyl ether dicarboxylic dichloride, and 1,8-octane dicarboxylic acid dichloride.

The following are some examples of disulfonic acid dichlorides used in the present invention: 1,3-benzene disulfonyl dichloride, 2,5-diethyl-1,3-benzene disulfonyl dichloride, 4,4*-phenyl ether disulfonyl dichloride, 4,4*-biphenyl disulfonyl dichloride, 1,10-decane disulfonic acid dichloride. The following are examples of bis chloroformates of the present invention but not limited to: diethyene glycol bischloroformate, diethyl glycol bischloroformate, 4,4*-dihydroxybiphenyl bischloroformate, 2,6-dihydroxynaphthalene bischloroformate, 4,4*-dihydroxybenzophenone bischloroformate, 4,4*-dihydroxyphenyl sulfone bischloroformate.

The following are some examples of bis phosphoryl chlorides used in the present invention: 1,4*-butanediol bisethoxy phosphoryl chloride, diethylene glycol bis methoxy phosphoryl chloride, 4-hydoxyphenyl sulfone ethoxy phosphoryl chloride.

The following are some examples of bis phosphonyl chlorides used in the present invention: 1,6-hexane bismethoxy phosphonyl chloride, 1,10-decane bisphenoxy phosphonyl chloride.

The following are some examples of the diisocyanates used in the present invention: 1,3-diisocyanatopropane, 1,10-diisocyanatodecane, 1,3-phenylene-diisocyanate, 1,5-naphthalene-diisocyanate, 4-isocyanato phenyl ether.

The following Examples 1–6 are model reaction examples given to illustrate the invention and should not be construed as limiting its scope.

EXAMPLE 1

N-Methyl-4-methylbenzene sulfonamide (3.70 g, 0.02 mol) and 4-methylbenzoyl chloride (3.08 g, 0.02 mol) were dissolved in xylene and refluxed for 72 hrs. After evaporation of the xylene, the residue was dissolved in ethyl acetate and washed with dilute sodium carbonate solution. After separation, drying over anhydrous magnesium sulfate and evaporation of the solvent in vacuo, the residue was recrystallized from hexane-ethyl acetate to give N-4-methylbenzoyl-N*-methyl-4-methylbenzene sulfonamide mp 90–92° C. MS m/z 303. (M+ calcd for $C_{16}H_{17}NO_3S=303$). H NMR (300 Mhz, $CDCl_3$) d 2.30 (s, 3, $CH_3$), 2.46 (s, 3, $CH_3$), 7.21 (m, 2, aromatic), 7.35 (m, 2, aromatic), 7.49 (m, 2, aromatic), 7.84 (m, 2, aromatic).

EXAMPLE 2

4-Methylbenzenesulfonyl chloride (3.80 g, 0.02 mol) and N-methyl-4-methylbenzene sulfonamide (3.70 g, 0.02 mol) were added to 1,2-dichlorobenzene (50 ml) and the solution refluxed for 48 hrs. The solvent was evaporated in vacuo and the residue recrystallized from hexane-acetone to give N*-methyl-N*-4-methylphenysulfonyl-4-methylbenzene sulfonamide mp 109–111° C. MS m/z 339. (M+ calcd for $C_{15}H_{17}NO_4S=339$). H NMR (300 Mhz, $CDCl_3$) d 2.43 (s, 6, CH3), 3.25 (s, 3, $NCH_3$), 7.34 (m, 4, aromatic), 7.88 (m, 4, aromatic).

EXAMPLE 3

Phenyl chloroformate (1.57 g, 0.01 mol) and N-methyl-4-methylbenzene sulfonamide (1.85 g, 0.01 mol) were diluted with 1,2-dichlorobenzene (15 ml) and refluxed for 40 hrs. The solvent was evaporated in vacuo and the residue diluted dichloromethane and the dichloromethane washed with water (2×), dried over anhydrous magnesium sulfate. Evaporation of the solvent in vacuo gave N-methyl-N*-phenoxycarbonyl-4-methylbenzene sulfonamide mp 98–100° C. MS m/z 305. (M+ calcd for $C_{15}H_{15}NO_4S=305$). H NMR (300 MHz, $CDCl_3$) d 2.43 (s, 3, $CH_3$), 2.45 (s, 3, $NCH_3$), 6.95 (m, 2, aromatic), 7.18–7.35 (m, 5, aromatic), 7.88 (m, 5, aromatic).

EXAMPLE 4

N-methyl-4-methylbenzene sulfonamide (4.65 g, 0.025 mol) was dissolved in toluene. Tetraethyl ammonium chloride (50 mg) and 50% sodium hydroxide were added to the solution. The reaction flask was fitted with a Dean & Stark apparatus and the solution refluxed for 2 hrs and diethyl phosphoryl chloride (4.31 g, 0.025 mol) was added to the reaction mixture and stirring continued for 2 hrs. After filtration of solids, the solvent was evaporated in vacuo to give N-methyl-N*-4-methylphenylsulfonyl diethyl phosphoramide. MS m/z 276 (M+ minus $OCH_2CH_3$). (M+ calcd for $C_{12}H_{20}NO_5PS$=321. H NMR (300 Mhz, $CDCl_3$) d (1.41 (m, 6, $CH_3$), 2.43 (s, 3, $CH_3$), 3.06 (d, 2, $NCH_3$), 4.20 (m, 4, $CH_2$), 7.31 (m, 2, aromatic), 7.87 (m, 2, aromatic).

EXAMPLE 5

N-Methyl-4-methylbenzene sulfonamide (3.70 g, 0.02 mol) was dissolved in dichloromethane (65 ml). Tetraethyl ammonium chloride (75 mg) and 50% sodium hydroxide (1.60 g) were added to the dichloromethane solution and the solution stirred at room temperature for 1 hr. Triphosgene (1 g) was diluted with dichloromethane (20 ml) and added dropwise the solution. The solids dissolved during the reaction. The dichloromethane solution was washed with water (2×) and dilute potassium carbonate and dried over anhydrous potassium carbonate. Evaporation of the solvent in vacuo gave 3.5 g of N-methyl-N*-(4-methylbenzenesulfonyl urea). MS m/z 332 (M+ minus $SO_2$) (M+ calcd for $C_{11}H_{15}NO_3S$=396). H NMR (300 Mhz, $CDCl_3$) d 2.45 (s, 3, $CH_3$), 3.16 (s, 3, $NCH_3$), 7.32 (m, 2, aromatic), 7.76 (m, 2, aromatic).

EXAMPLE 6

Phenyl isocyanate (1.19 g, 0.01 mol) and N-methyl-4-methylbenzene sulfonamide (1.85 g, 0.01 mol) were dissolved in 1,2-dichlorobenzene (20 ml) and refluxed for 40 hrs. After cooling, the solvent was evaporated in vacuo to give a viscous oil that crystallized on standing to give N-methyl-N-4-methylphenyl-N*-phenyl urea mp 63–65° C. MS m/z 304. (M+ calcd for $C_{15}H_{16}N_2O_3S$=304). H NMR (300 Mhz, $CDCl_3$) d 2.43 (s, 3, $CH_3$), 2.65 (s, 3, $CH_3$), 7.33 (m, 5, aromatic), 7.48 (m, 1, aromatic), 7.75 (m, 3, aromatic).

The following examples illustrate the formation of the polymers of the present invention but are not intended to be limiting.

EXAMPLE 7

POLYMERIZATION OF N,N*-BIS-4-METHYLBENZENESULFONYL ETHYLENE DIAMINE AND ADIPOYL CHOLRIDE

N,N*-bis-4-methylbenzenesulfonyl ethylene diamine was prepared from ethylene diamine and 4-methylbenzenesulfonyl chloride and recrystallized from aqueous methanol mp 160–162° C. The disulfonamide (1.49 g, 0.004 mol) was dissolved in dichloromethane (60 ml). Tetraethyl ammonium chloride and 50% sodium hydroxide (0.64 g) were added to the solution. The reaction mixture was stirred for 1 hr to form the sodium salt, then the adipoyl chloride (0.73 g, 0.064 mol) was diluted with dichloromethane (20 ml) and added dropwise to the solution over 20 min. After 2 hr, the dichloromethane solution was washed with water (2×), dilute potassium carbonate and dried over anhydrous potassium carbonate and the solution evaporated in vacuo to give a white solid mp 90–110° C. The absence of an NH band in the IR spectrum and the presence of a carbonyl band at 1698 $cm^{-1}$ were in agreement with the polymer structure.

EXAMPLE 8

POLMERIZATION OF N,N* BIS-4-METHYLBENZENESULFONYL ETHYLENE DIAMINE AND 4,4*-PHENYL ETHER DISULFONYL DICHLORIDE

N,N*-Bis-4-methylbenzenesulfonyl ethylene diamine (1.10 g, 0.003 mol) was dissolved in dichloromethane (60 ml). Tetraethyl ammonium chloride (50 mg) and 50% sodium hydroxide (48 g) were added to the solution. The reaction was stirred for 1 hr to form the disodium salt, then 4,4*-phenyl ether disulfonyl dichloride (1.10 g, 0.003 mol) in dichloromethane (20 ml) was added dropwise to the solution at room temperature with the disappearance of the slurry. After 2 hrs, the dichloromethane solution was washed with water (2×), dilute potassium carbonate and the solution dried over anhydrous potassium carbonate. The solvent was evaporated in vacuo to give a white solid mp >290° C. The absence of the NH band of the diimide in the IR spectrum was in agreement with the theoretical polymer structure. The melting point indicates a thermoplastic resin that can be injection molded or extruded into useful shapes.

EXAMPLE 9

POLMERIZATION OF N,N*-BIS-4-METHYLBENZENESULFONYL ETHYLENE DIIAMINE AND 2,4-DIISOCYANTOTOLUENE

N,N*-Bis-4-methylbenzenesulfonyl ethylene diamine (1.84 g, 0.05 mol) and 2,4-diisocyanatotoluene (0.87 g, 0.005 mol) were diluted with dichloromethane (10 ml). Tetrahydrofuran (10 ml) was added to completely dissolve the diimide. Triethylamine (50 mg) was added and the solution stirred overnight at room temperature. The solvent and catalyst were removed in vacuo to give a white solid mp 95–110° C. The IR spectrum had and NH band at 3293 $cm^{-1}$ and a strong carbonyl band at 1713 $cm^{-1}$. The disappearance of the very strong isocyanate band at 2270 cm-1 was also in agreement with the polymer structure.

What is claimed is:

1. A condensation polymer having repeating units A-B, where A is derived from an N,N*-disubstituted disulfonamide and B is derived from an organic acid dihalide.

2. A condensation polymer obtained by the condensation of disubstituted disulfonamide having the formulas

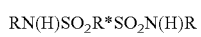  RN(H)SO$_2$R*SO$_2$N(H)R      1a

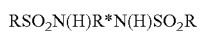  RSO$_2$N(H)R*N(H)SO$_2$R      1b,

R is a monovalent hydrocarbon alkyl aryl, aryl-alkyl, alkyl-aryl radical of 1–20 carbon atoms or a monovalent inertly substituted hydrocarbon aryl, alkyl, alkyl-aryl or aryl-alkyl radical of 1–20 carbons atoms and R* is a divalent hydrocarbon arylene, alkylene, alkylene-aryl, arylene-alkyl radical or combinations thereof of 2–20 carbon atoms or an inertly substituted divalent hydrocarbon alkylene, arylene, arylene-alkyl, or alkylene-aryl radical or combinations thereof of 2–20 carbon atoms and organic diacid chlorides or diisocyanates.

3. The condensation polymer of claim 1 wherein the organic acid dihalide is a dicarboxylic acid dichloride, disulfonic acid dichloride, phosphoric acid dichloride, phosphonic acid dichloride, bis chloroformates or phosgene.

4. The condensation polymer of claim 2 having repeating units of the formula:

—N(R)SO$_2$R*SO$_2$N(R)P(O)(OR)OR*OP(O)(OR)—.

5. The condensation polymer of claim 2 having repeating units of the formula:

—N(R)SO$_2$R*SO$_2$N(R)C(O)—.

6. The condensation polymer of claim 2 having repeating units of the formula:

—N(R)SO$_2$R*SO$_2$N(R)C(O)N(H)R*N(H)C(O)—.

7. The condensation polymer of claim 2 having repeating units of the formula:

—N(RSO$_2$)R*N(RSO$_2$)C(O)R*C(O)—.

8. The condensation polymer of claim 2 having repeating units of the formula:

—N(RSO$_2$)R*N(RSO$_2$)SO$_2$R*SO$_2$—.

9. The condensation polymer of claim 2 having repeating units of the formula:

—N(RSO$_2$)R*N(RSO$_2$)C(O)OR*OC(O)—.

10. The condensation polymer of claim 2 having repeating units of the formula:

—N(RSO$_2$)R*N(RSO$_2$)P(O)(OR)R*P(O)(OR)—.

11. The condensation polymer of claim 2 having repeating units of the formula:

—N(RSO2)R*N(RSO2)P(O)(OR)OR*OP(O)(OR)—.

12. The condensation polymer of claim 2 having repeating units of the formula:

—N(RSO$_2$)R*N(RSO$_2$)C(O)—.

13. The condensation polymer of claim 2 obtained by condensing the disulfonamide with a diisocyanate.

14. The condensation polymer of claim 7 that is prepared from N,N*-4-methylphenylsulfonyl ethylene diamine and adipoyl chloride.

15. The condensation polymer of claim 8 that is prepared from N,N*-4-methylphenylsulfonyl ethylene diamine and 4,4*- phenyl ether disulfonyl dichloride.

16. The condensation polymer of claim 2 that is prepared from N,N*-4-methylphenylsulfonyl ethylene diamine and 2,4-diisocyanatotoluene.

17. The condensation polymer of claim 2 having repeating units of the formula:

—N(R)SO$_2$R*SO$_2$N(R)SO$_2$R*SO$_2$—.

18. The condensation polymer of claim 2 having repeating units of the formula:

—N(R)SO$_2$R*SO$_2$(R)NROC(O)R*OC(O)—.

19. The condensation polymer of claim 2 having repeating units of the formula:

—N(R)SO$_2$R*SO$_2$(R)N(R)P(O)(OR)R*P(O)(OR)—.

20. The condensation polymer of claim 2 having repeating units of the formula:

—N(RSO$_2$)R*(RSO$_2$)NC(O)N(H)R*N(H)C(O)—.

* * * * *